United States Patent
DeLand (10) Patent No.: US 10,167,832 B2
(45) Date of Patent: Jan. 1, 2019

(54) SOLENOID HAVING SELECTIVE LATCH FOR SOLENOID-ACTUATED VALVE

(71) Applicant: BorgWarner Inc., Auburn Hills, MI (US)

(72) Inventor: Daniel L. DeLand, Davison, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/631,238

(22) Filed: Jun. 23, 2017

(65) Prior Publication Data

US 2017/0370339 A1    Dec. 28, 2017

Related U.S. Application Data

(60) Provisional application No. 62/354,163, filed on Jun. 24, 2016.

(51) Int. Cl.

| F02M 59/06 | (2006.01) |
|---|---|
| F02M 59/36 | (2006.01) |
| F16K 31/06 | (2006.01) |
| F16L 3/16 | (2006.01) |
| F16L 37/28 | (2006.01) |
| G09F 3/03 | (2006.01) |
| F16K 1/00 | (2006.01) |

(52) U.S. Cl.
CPC ............ *F02M 59/366* (2013.01); *F16K 1/00* (2013.01); *F16K 31/0655* (2013.01); *F16L 3/16* (2013.01); *F16L 37/28* (2013.01); *G09F 3/0305* (2013.01); *B65D 2563/108* (2013.01)

(58) Field of Classification Search
CPC ..... F02M 59/366; F16K 1/00; F16K 31/0655; F16L 3/16; F16L 37/28; G09F 3/0305; B65D 2563/108
USPC ................. 251/65, 129.15–129.22, 297, 284
See application file for complete search history.

(56) References Cited

U.S. PATENT DOCUMENTS

| 1,200,375 | A | * | 10/1916 | Little, Jr. | ............ | F16K 31/0679 |
| | | | | | | 251/129.1 |
| 1,819,452 | A | * | 8/1931 | Wright | ................ | F16K 31/0679 |
| | | | | | | 251/257 |
| 1,883,766 | A | * | 10/1932 | Cox | .................... | G05D 23/2754 |
| | | | | | | 310/15 |
| 2,224,147 | A | * | 12/1940 | Ehlers | ................. | F16K 31/0679 |
| | | | | | | 251/70 |
| 2,834,570 | A | * | 5/1958 | Harrison | ................. | F16K 31/10 |
| | | | | | | 251/129.19 |
| 3,379,214 | A | * | 4/1968 | Weinberg | .............. | F16K 31/082 |
| | | | | | | 251/129.15 |
| 3,942,485 | A | * | 3/1976 | Suda | ........................ | F02D 41/20 |
| | | | | | | 251/297 |
| 3,977,436 | A | * | 8/1976 | Larner | .................. | F16K 31/082 |
| | | | | | | 251/129.15 |
| 4,557,455 | A | | 12/1985 | Benjamin | | |
| 4,691,943 | A | | 9/1987 | DeLand et al. | | |

(Continued)

*Primary Examiner* — John Bastianelli
(74) *Attorney, Agent, or Firm* — Howard & Howard Attorneys PLLC (57) ABSTRACT

A solenoid for a solenoid-actuated valve includes a coil, a flux tube, a pole piece disposed axially from the flux tube and encircled by the coil, a movable armature disposed in the flux tube and the pole piece, and a latch disposed between the flux tube and the pole piece to selectively latch the armature into at least one position.

14 Claims, 14 Drawing Sheets

(56) References Cited

U.S. PATENT DOCUMENTS

| | | | | |
|---|---|---|---|---|
| 5,351,934 A | * | 10/1994 | Jensen | F16K 1/123 |
| | | | | 251/65 |
| 5,529,281 A | * | 6/1996 | Brudnicki | F16K 31/0651 |
| | | | | 251/129.21 |
| 8,186,647 B2 | | 5/2012 | Chen et al. | |
| 8,505,573 B2 | * | 8/2013 | Herbert | F16K 31/0672 |
| | | | | 251/129.17 |
| 9,068,668 B2 | | 6/2015 | Grover | |
| 2013/0306891 A1 | | 11/2013 | Fietz et al. | |

* cited by examiner

SOLENOID HAVING SELECTIVE LATCH FOR SOLENOID-ACTUATED VALVE

CROSS-REFERENCE TO RELATED APPLICATION(S)

The present application claims priority to and all the benefits of U.S. Provisional Patent Application No. 62/354,163, filed on Jun. 24, 2016, which is hereby expressly incorporated herein by reference in its entirety.

BACKGROUND OF INVENTION

1. Field of Invention

The present invention relates generally to solenoid-actuated valves for automatic transmissions and, more specifically, to a solenoid having a selective latch for a solenoid-actuated valve.

2. Description of the Related Art

Conventional vehicles known in the art typically include an engine having a rotational output as a rotational input into a transmission such as an automatic transmission. The engine generates the rotational output which is selectively translated to the transmission which, in turn, translates rotational torque to one or more wheels. The transmission changes the rotational speed and torque generated by the engine through a series of predetermined gearsets, whereby changing between the gearsets enables a vehicle to travel at different vehicle speeds for a given engine speed.

In addition to changing between the gear sets, the automatic transmission is also used to modulate engagement with the rotational output of the engine, whereby the transmission can selectively control engagement with the rotational output of the engine so as to facilitate vehicle operation. By way of example, torque translation between the rotational output of the engine and the input into the automatic transmission is typically interrupted while the vehicle is parked or idling, or when the transmission changes between the gearsets. In conventional automatic transmissions, modulation is achieved via a hydrodynamic device such as a hydraulic torque converter. However, modern automatic transmissions may replace the torque converter with one or more electronically and/or hydraulically actuated clutches (sometimes referred to in the art as a "dual clutch" automatic transmission). Automatic transmissions are typically controlled using hydraulic fluid and a hydraulic system including a pump assembly, a valve housing having one or more solenoid-actuated valves, and an electronic controller. The pump assembly provides a source of fluid power to the solenoid-actuated valves of the valve housing which, in turn, are actuated by the controller so as to selectively direct hydraulic fluid throughout the automatic transmission to control modulation of rotational torque generated by the rotational output of the engine. The solenoid-actuated valves are also typically used to change between the gear sets of the automatic transmission, and may also be used to control hydraulic fluid used to cool and/or lubricate various components of the transmission in operation.

It is also known to provide releasable latches. An example of such a releasable latch for a fluid coupling is disclosed in U.S. Pat. No. 4,691,943 to Daniel L. DeLand and Leon F. LaVene. Another example of a releasable latch for securing objects relative to each other is disclosed in U.S. Pat. No. 4,557,455 to Benjamin C. Benjamin. However, such releasable latches are not known for a solenoid-actuated valve.

Accordingly, it is desirable to provide a new solenoid for a solenoid-actuated valve. It is also desirable to provide a solenoid for a solenoid-actuated valve having a releasable latch. It is further desirable to provide a solenoid having a selectable latch cooperating with an armature or valve of a solenoid-actuated valve. Thus, there is a need in the art to provide a solenoid having a selective latch for a solenoid-actuated valve that meets at least one of these desires.

SUMMARY OF THE INVENTION

The present invention provides a solenoid for a solenoid-actuated valve including a coil, a flux tube, a pole piece disposed axially from the flux tube and encircled by the coil, a movable armature disposed in the flux tube and the pole piece, and a latch disposed between the flux tube and the pole piece to selectively latch the armature into at least one position.

One advantage of the present invention is that a new solenoid for a solenoid-actuated valve is provided. Another advantage of the present invention is that the solenoid includes a selective latch to latch an armature or valve into at least one position. Yet another advantage of the present invention is that the solenoid-actuated valve includes a valve for flow control or pressure control that can be latched in one or more positions allowing the solenoid to be de-energized during extended periods of steady state operation.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 10a is a top view of the latch of FIGS. 4-9a.

FIG. 10b is a side view of the latch of FIGS. 4-9a.

FIG. 10c is a section view of the latch of FIGS. 4-9a.

DETAILED DESCRIPTION OF THE INVENTION

Figure 1:
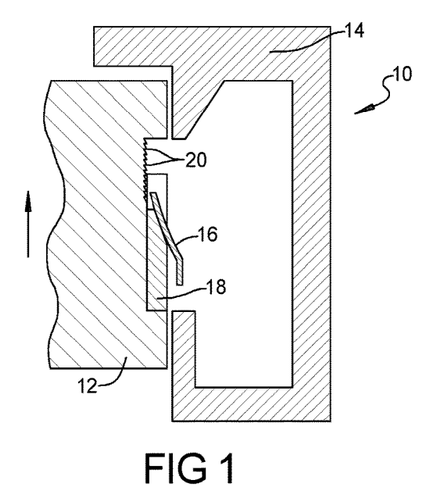
FIG. 1 is partial cross-sectional view of one embodiment of a solenoid, according to the present invention, for a solenoid-actuated valve illustrating a latch and an armature at an upper stroke limit where it has pushed a blocker to lift the latch out of a latching position.
Figure 2:
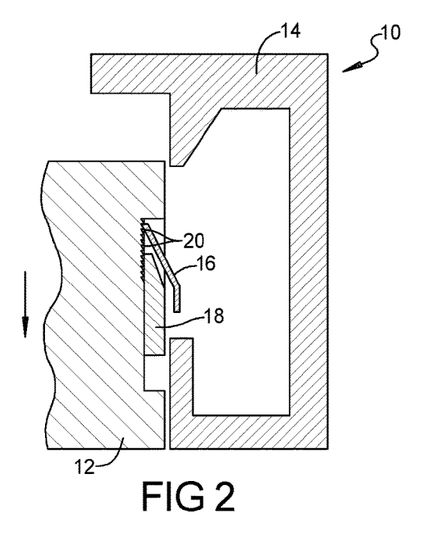
FIG. 2 is a view similar to FIG. 1 illustrating the blocker remaining in a blocking position until the armature moves downward enough to push the blocker out of the blocking position.
Figure 3:
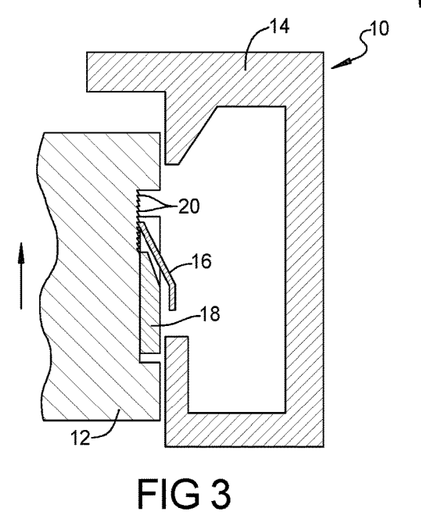
FIG. 3 is a view similar to FIG. 1 illustrating the armature moved upward by energizing a coil to a desired operating point and the latch engages a notch or notches as the armature moves.

Referring now to the FIGS. 1-3, where like numerals are used to designate like structure unless otherwise indicated, a solenoid 10, according to one embodiment of the present invention, for a solenoid-actuated valve is shown for use in conjunction with an automatic transmission (not shown) for a vehicle (not shown). The vehicle includes an engine (not shown) that cooperates with the automatic transmission. The engine generates rotational torque which is selectively translated to the automatic transmission which, in turn, translates rotational torque to one or more wheels of the vehicle. It should be appreciated that the engine and/or automatic transmission could be of any suitable type, configured in any suitable way sufficient to generate and translate rotational torque so as to drive the vehicle, without departing from the scope of the present invention. It should also be appreciated that the solenoid-actuated valve 10 may be used in another system such as in a transfer case, locking differential, or a disconnect clutch in a hybrid drivetrain. It should further be appreciated that the solenoid-actuated valve 10 may be used in other applications where it is necessary to modulate the engagement of a system and then leave the system engaged for a period of time.

In one embodiment illustrated in FIGS. 1-3, the solenoid 10 includes an armature 12, a flux path 14, a latch 16, and a release slide or blocker 18 to disable the latch 16. In this embodiment, the latch 16 is a latch spring. The armature 12 may include an annular recess or clearance zone extending axially and the blocker 18 is slideably disposed in the recess of the armature 12. The blocker 18 extends axially and has a detent to engage and hold the latch 16 in an unlatched position.

As illustrated in FIG. 1, the armature 12 is at an upper stroke limit and has pushed the blocker 18 to lift the latch 16 out of a latching position. As illustrated in FIG. 2, the blocker 18 remains in a blocking position until the armature 12 moves downward enough to push the blocker 18 out of the blocking position. As illustrated in FIG. 3, the armature 12 is moved upward by energizing a coil (not shown) to a desired operating point. When this occurs, the latch 16 engages one or more notches 20 in the armature 12 as the armature 12 moves. When the desired operating point is reached, the coil can be de-energized and the armature 12 remains at the desired operating point. Re-energizing the coil with a higher current sufficient to reach the upper stroke limit will push the blocker 18 into the blocking position, allowing the armature 12 and associated valve (not shown) to operate in both directions until the blocker 18 is pushed out of the blocking position as illustrated in FIG. 2. It should be appreciated that the releasable, resettable latch 16 does not have to engage the armature 12 and could be a valve or other component moved by the armature 12. It should also be appreciated that the solenoid 10 may include an armature spring (not shown). It should further be appreciated that FIGS. 1-3 show a simplified illustration of the solenoid 10 and a coil of the solenoid 10 is not shown.

Referring to FIGS. 4-9a, where like numerals are used to designate like structure unless otherwise indicated, another embodiment, according to the present invention of the solenoid 10 for a solenoid-actuated valve 30 is shown. The solenoid-actuated valve 30 includes a valve body 32 and a valve 34. The valve body 32 includes one or more supply or fluid ports 36, a passage 38 that is annular and extends axially, and one or more metering lands 40 that are annular and disposed along the passage 38. The supply ports 36 are fluidly connected to the passage 38. The valve 34 is slideably disposed in the passage 38 of the valve body 32. The valve 34 is cylindrical in shape and extends axially. The valve 34 includes one or more metering ports 42 and a passage 44 that is annular and extends axially. The metering ports 42 fluidly connect to the passage 44 to allow fluid flow to and from a controlled device (not shown) through a control port 46 in the valve body 32. The valve body 32 also includes one or more exhaust ports 48 to vent fluid from the controlled device for reduction of control pressure. The solenoid-actuated valve 30 further includes a retainer 50 on the valve 34 and a bias spring 52 that is disposed between the retainer 50 and the valve body 32 and pushes upward against the retainer 50 on the valve 34. It should be appreciated that the valve 34 is integral, unitary, and one-piece. It should also be appreciated that the valve 34 moves axially relative to the valve body 32. It should further be appreciated that the valve 34 is adapted to control the flow of pressurized hydraulic fluid between the ports 36 and 48 of the valve body 32.

The solenoid-actuated valve 30 also includes an electronically controlled solenoid or solenoid actuator, generally indicated at 54, for actuating the valve 34 to control hydraulic fluid pressure and flow between the ports 36 and the ports 48. The solenoid 54 includes a magnetic housing or frame referred to as a casing or can 56. The can 56 is typically fabricated from a soft magnetic material, such as low carbon steel. The solenoid 54 also includes a bobbin 58 mounted inside the can 56. The bobbin 58 is typically made from a non-magnetic material such as a plastic or other polymeric material. The bobbin 58 has a primary electromagnetic coil 60 wound thereon to create a magnetic field when energized. The coil 60 is fabricated with copper wire. The solenoid 54 further includes an electrical connector 62 for connecting with the electromagnetic coil 60 and to ground (not shown). The electrical connector 62 includes one or more electrical terminals (not shown) to allow for connection with a control source which controls current actuation of the coil 60. It should be appreciated that the terminal receives a digital control signal from a primary driver (not shown) such as the electronic controller (not shown).

The solenoid 54 also includes a pole piece 64 partially positioned within the bobbin 58 and encircled by the coil 60. The pole piece 64 is magnetically connected with the can 56. The solenoid 54 also includes a flux tube 66 partially positioned within the bobbin 58 and encircled by the coil 60. The flux tube 66 is generally cylindrical in shape with a generally circular cross-section. The flux tube 66 is axially aligned with the pole piece 64. The flux tube 66 is magnetically connected with the can 56. It should be appreciated that the solenoid 54 has a flux path, generally indicated at 68, comprised of the pole piece 64, flux tube 66, and the can 56.

The solenoid 54 further includes an armature 70 disposed in the flux tube 66 for generating axial actuation force. The armature 70 is generally cylindrical in shape and extends axially. The armature 70 may include an annular recess or clearance zone 72 extending axially and a reset shoulder 73 at one end axial thereof and another shoulder at the other axial end thereof. The armature 70 may include a latch ring 74 extending circumferentially and radially into the recess 72. The solenoid 54 also includes an air gap spacer 76 seated on the pole piece 64 and spaced axially from the armature 70. The air gap spacer 76 is a ring shaped member. It should be appreciated that the armature 70 slides within the flux tube 66 and contacts the valve 34 to move the valve 34 axially. It should also be appreciated that the recess 72, latch ring 74 and reset shoulder 73 may be provided on the valve 34 instead of the armature 70.

Figure 10A:
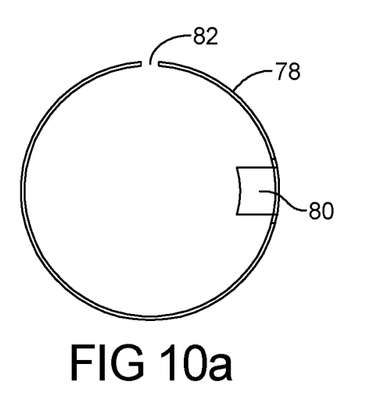
Figure 10B:
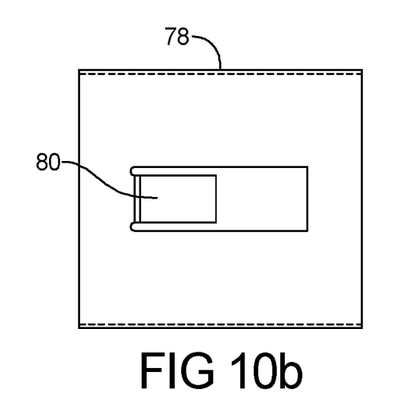
Figure 10C:
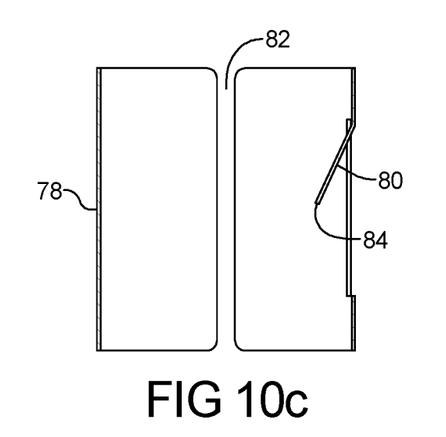

The solenoid 54 further includes an alignment tube 78 to set the axial spacing and centering of the pole piece 64 relative to the flux tube 66. The solenoid 54 also includes a latch, generally indicated at 79, to latch the armature 70 in one or more positions. In the present invention, the latch 79 includes the alignment tube 78 having one or more flexible latch fingers 80. As illustrated in FIGS. 10a, 10b and 10c, in one embodiment, the alignment tube 78 is formed from a sheet of suitable spring material leaving a longitudinal gap 82. In another embodiment, the edges of the alignment tube 78 forming the gap 82 could be welded or have interlocking tabs to provide hoop strength. In the embodiment illustrated, the latch 79 includes a single latch finger 80 formed by piecing and bending, although there could be multiple latch fingers 80. It should be appreciated that the tip of the latch finger 80 may be rounded 82 to prevent the latch finger 80 from scraping a release slide 84 to be described subsequently and shown in FIG. 4.

The solenoid 54 further includes a release slide or blocker 84 slideably disposed in the recess 72 of the armature 70. The release slide 84 extends axially. The release slide 84 has a detent 86 to engage and hold the latch finger 80 in an unlatched position. It should be appreciated that the flux tube 66 includes a clearance notch 88 for the latch finger 80 and a channel 90 to guide the release slide 84.

In operation, an electronic controller (not shown) is in electrical communication with the solenoid-actuated valve 30 to activate or energize the solenoid 54 to actuate the valve 34 or to deactivate or de-energize the solenoid 54 to de-actuate the valve 34 to actively control fluid flow to and from the solenoid-actuated valve 30.

Figure 4:
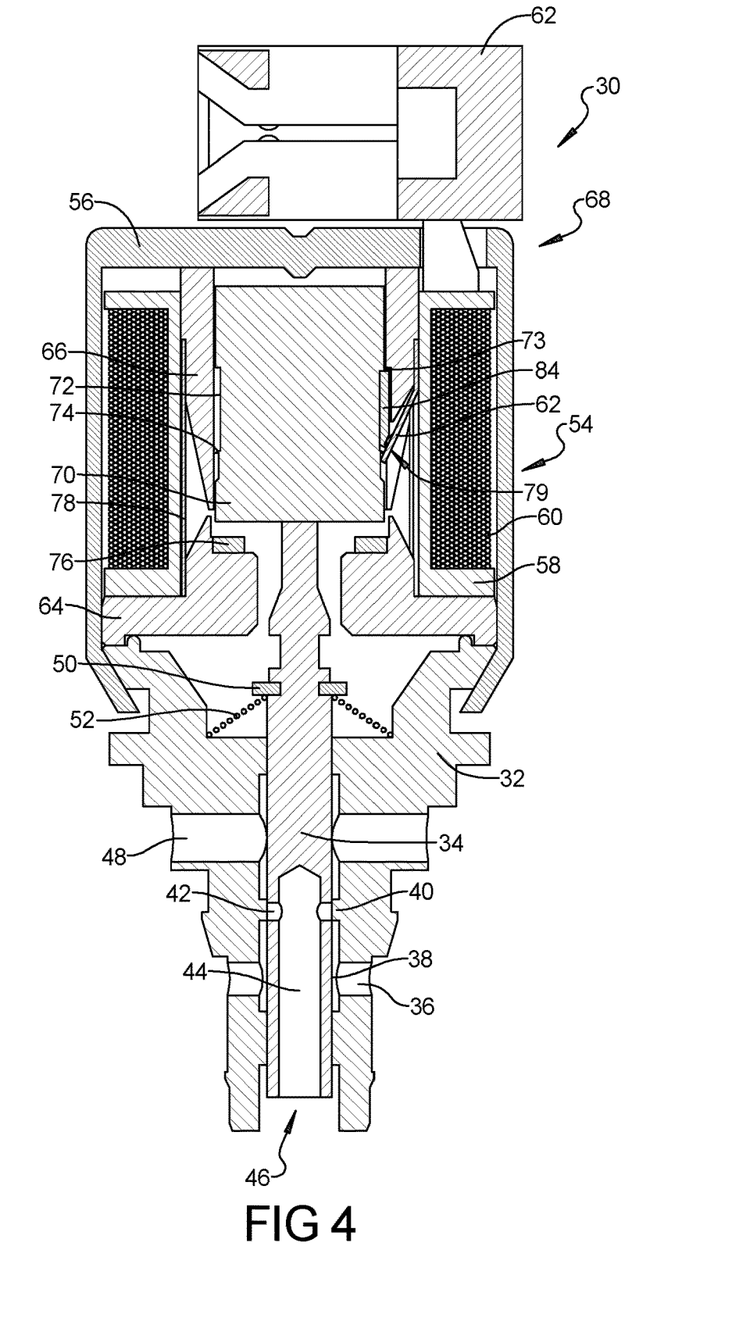
FIG. 4 is a cross-sectional view of another embodiment, according to the present invention, of a solenoid for a solenoid-actuated valve, according to the present invention, illustrating a latch in a first or regulating position.
Figure 4A:
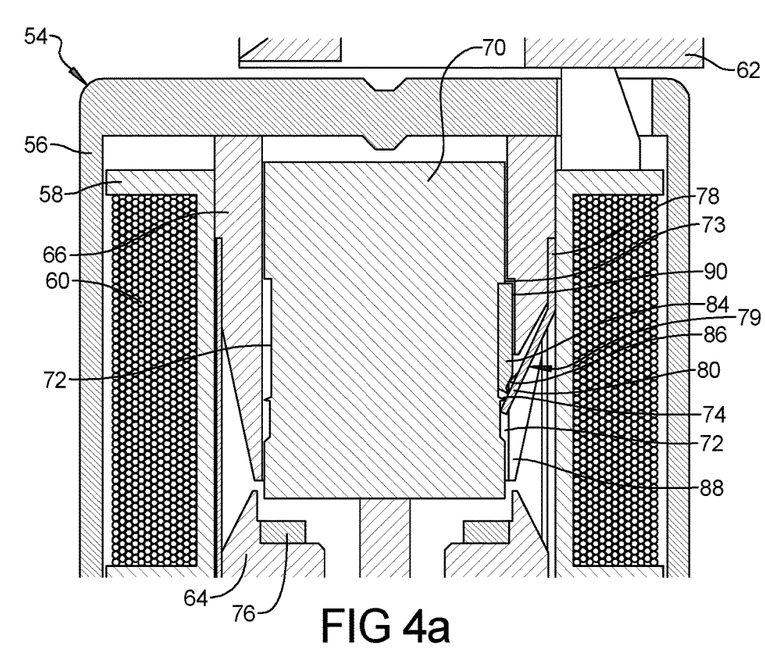
FIG. 4a is an enlarged view of a portion of FIG. 4 illustrating detail of the latch.

Referring to FIGS. 4 and 4a illustrating the latch 79 in a first or regulating position, the armature 50 is in an unlatched condition with a range of motion that allows pressure or flow regulation over the desired operating range.

Figure 5:
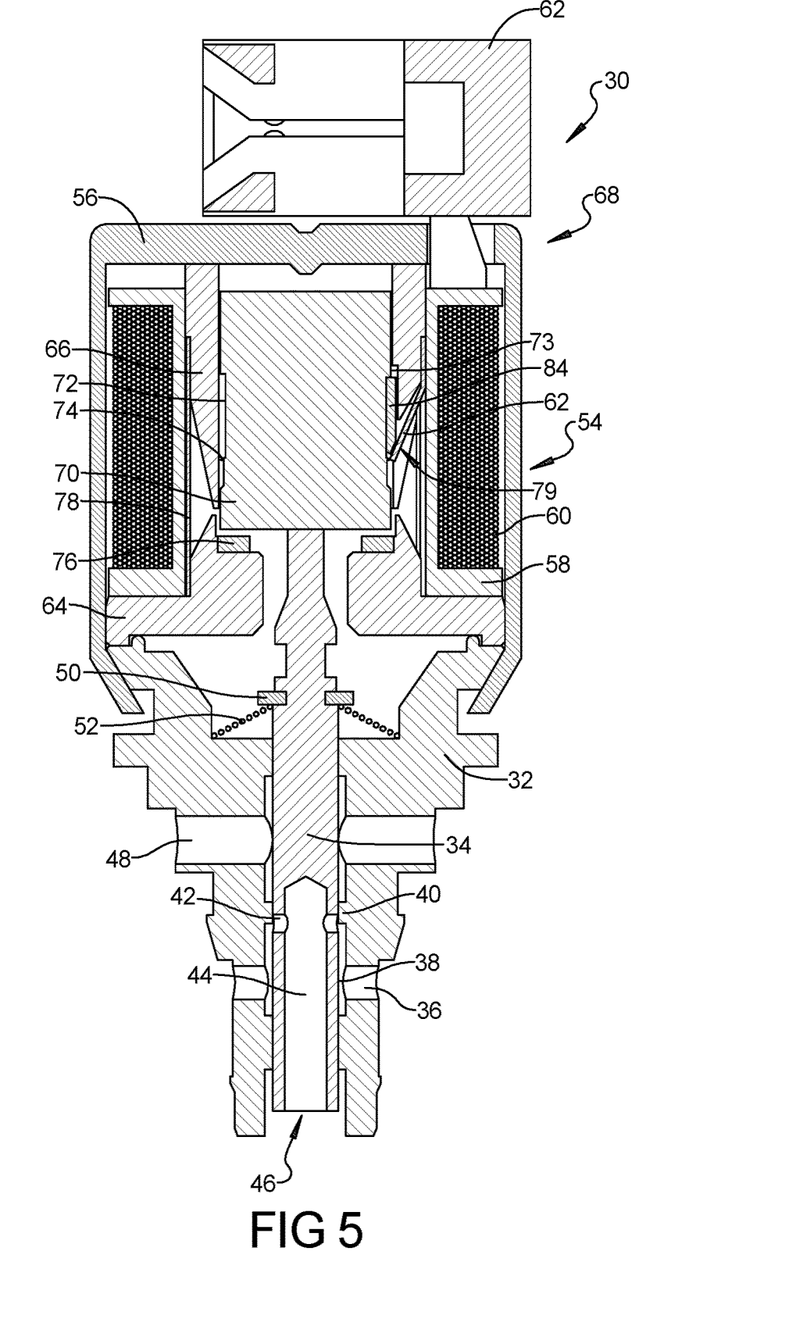
FIG. 5 is a view similar to FIG. 4 illustrating the latch in a second or latched position.
Figure 5A:
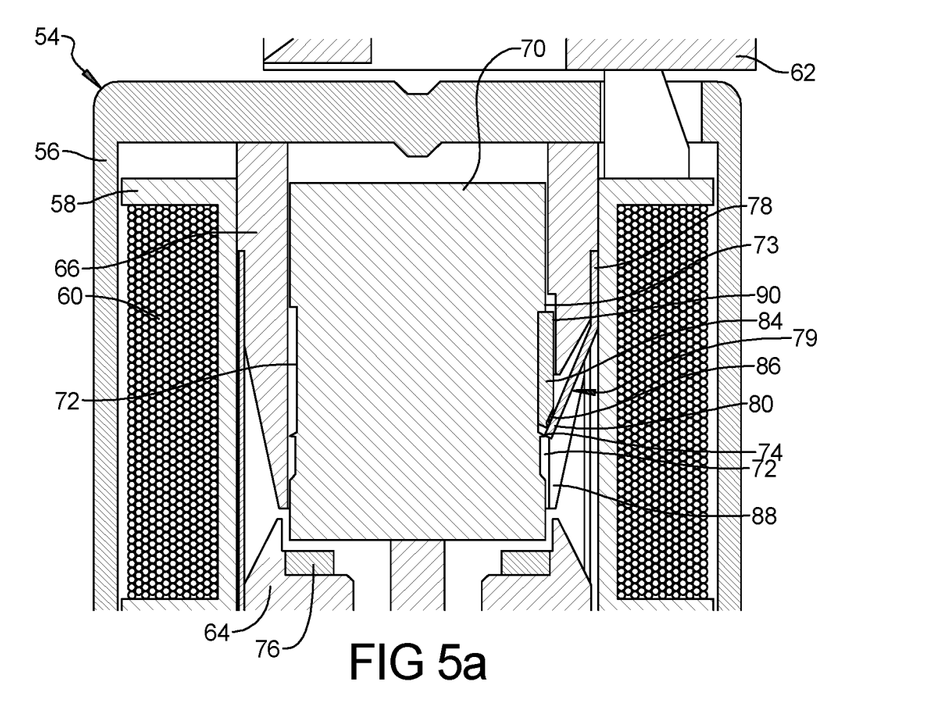
FIG. 5a is an enlarged view of a portion of FIG. 5 illustrating detail of the latch.

Referring to FIGS. 5 and 5a illustrating the latch 79 in a second or latched position, the current through the coil 60 of the solenoid 54 has been increased, causing the armature 70 to move toward the pole piece 64 so that the latch finger 80 has latched behind the latch ring 74. In this condition, the current through the coil 60 can be shut off and the valve 34 will remain open from supply to control, maintaining a high pressure to the downstream device.

Figure 6:
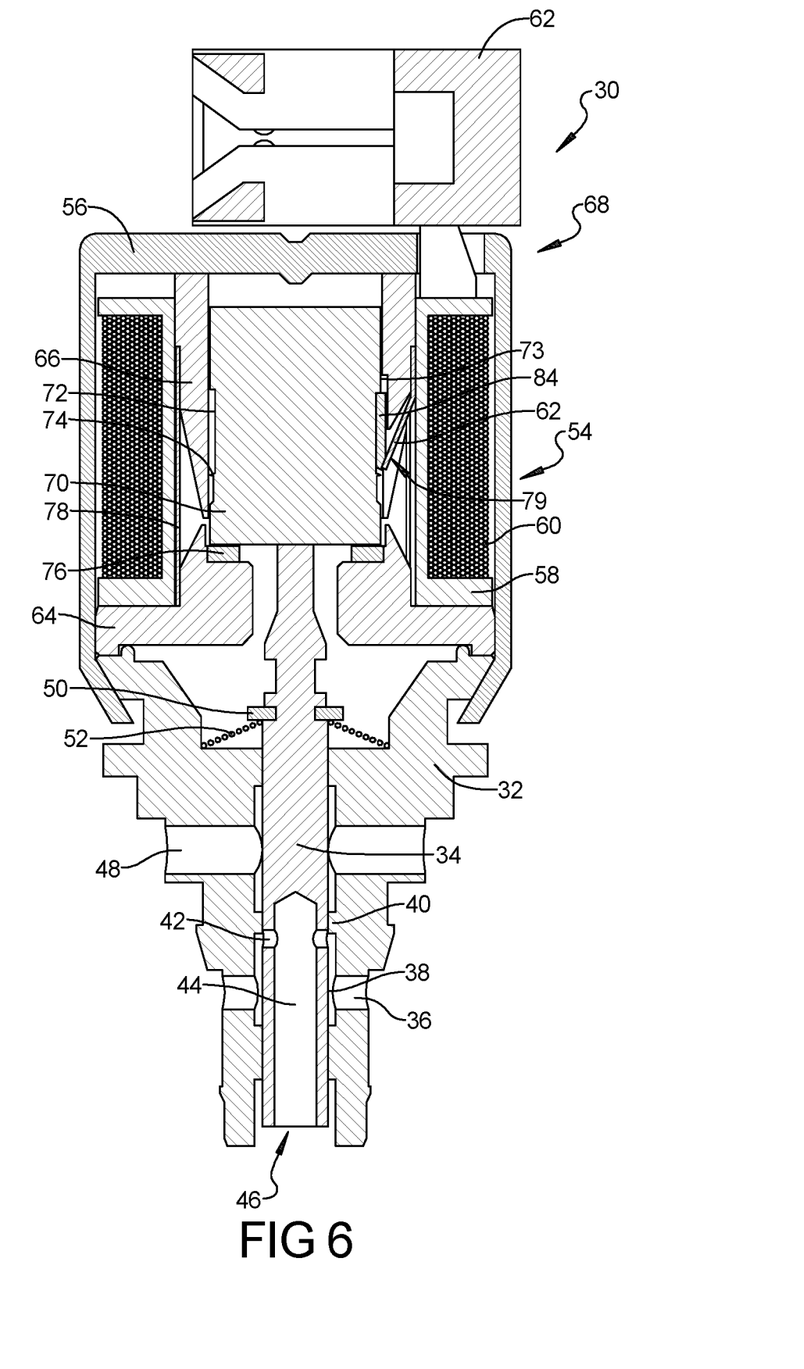
FIG. 6 is a view similar to FIG. 4 illustrating the latch in a third position with a release slide or blocker engaged.
Figure 6A:
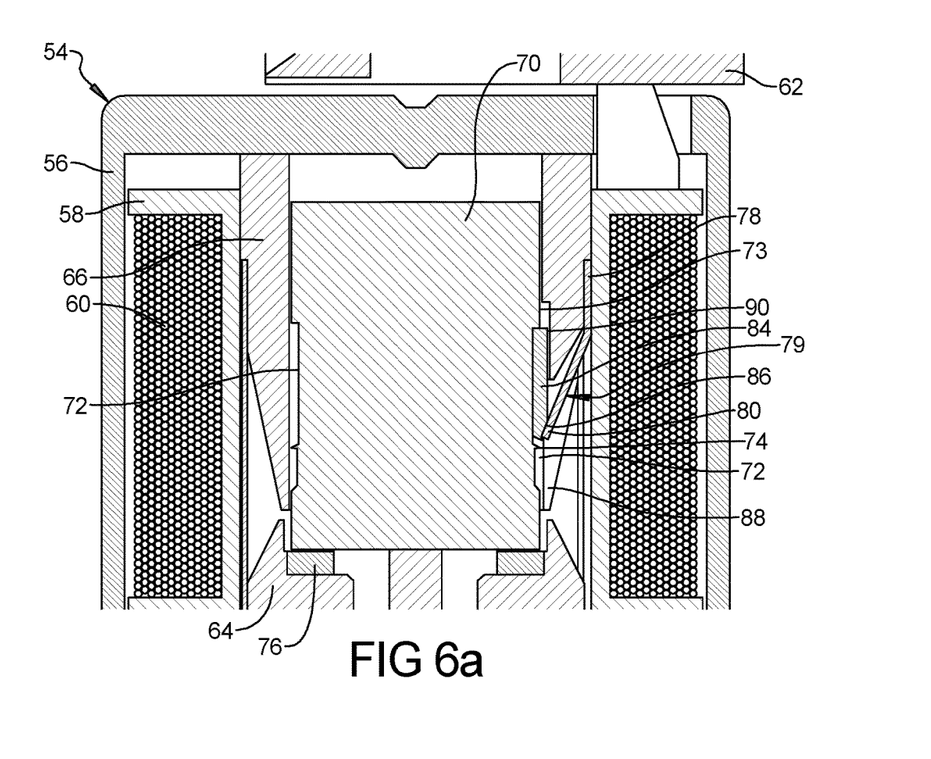
FIG. 6a is an enlarged view of a portion of FIG. 6 illustrating detail of the latch.

Referring to FIGS. 6 and 6a illustrating the latch 79 in a third position with the release slide 84 engaged, the coil 60 of the solenoid 54 has been re-energized. The current through the coil 60 has been increased so that the armature 70 moves past the latched position. The reset shoulder 73 has advanced the release slide 84 so that the latch finger 80 rests in the detent 86 of the release slide 84, preventing the latch finger 80 from latching on the latch ring 74.

Figure 7:
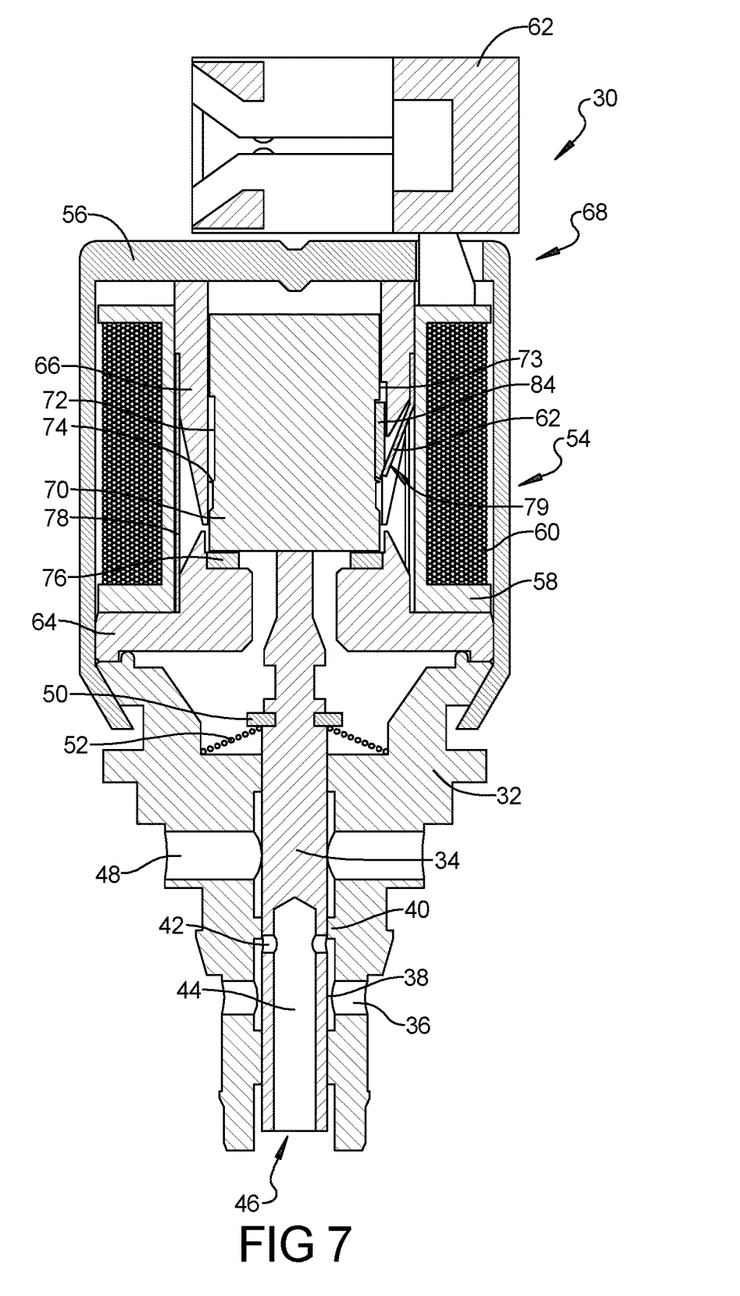
FIG. 7 is a view similar to FIG. 4 illustrating the latch in a fourth position with the release slide or blocker engaged and an armature approaching the release position.
Figure 7A:
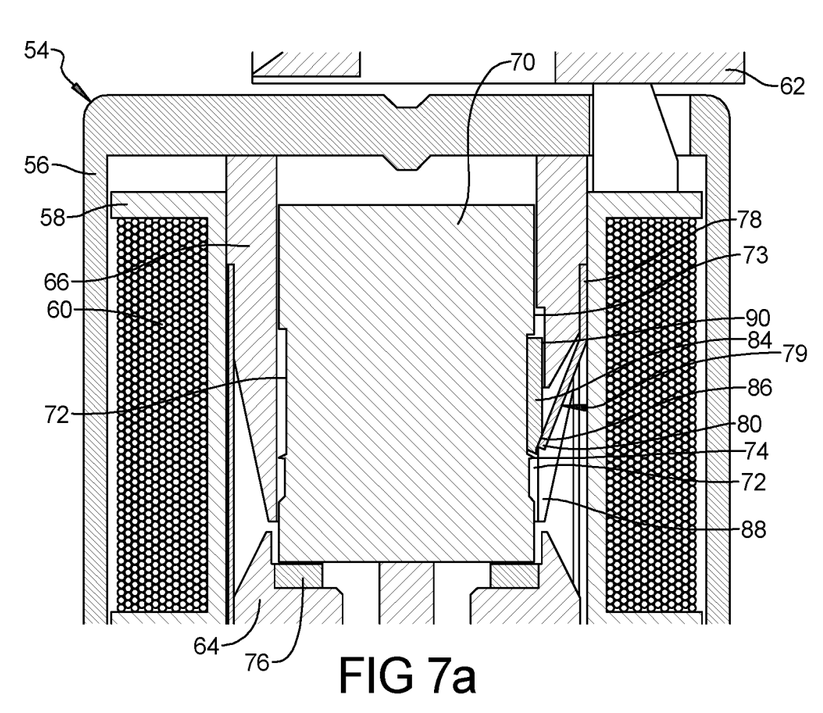
FIG. 7a is an enlarged view of a portion of FIG. 7 illustrating detail of the latch.

Referring to FIGS. 7 and 7a illustrating the latch 79 in a fourth position with the release slide 84 engaged and the armature 70 approaching the release position, the current through coil 60 of the solenoid 54 has been reduced. The armature 70 has moved upward. The release slide 84 is held in position by the latch finger 80, resting in the detent 86 of the release slide 84.

Figure 8:
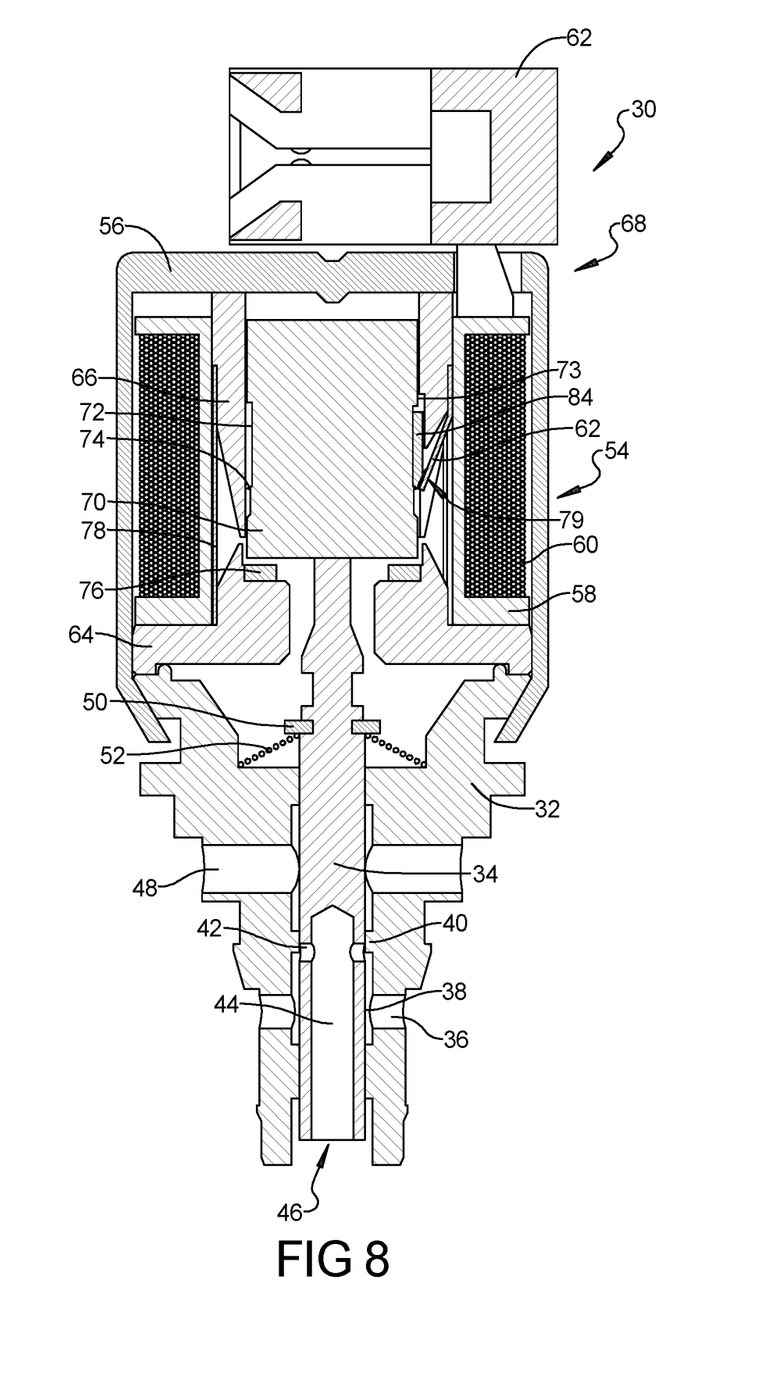
FIG. 8 is a view similar to FIG. 4 illustrating the latch in a fifth position with the armature pushing the release slide out of the engaged position.
Figure 8A:
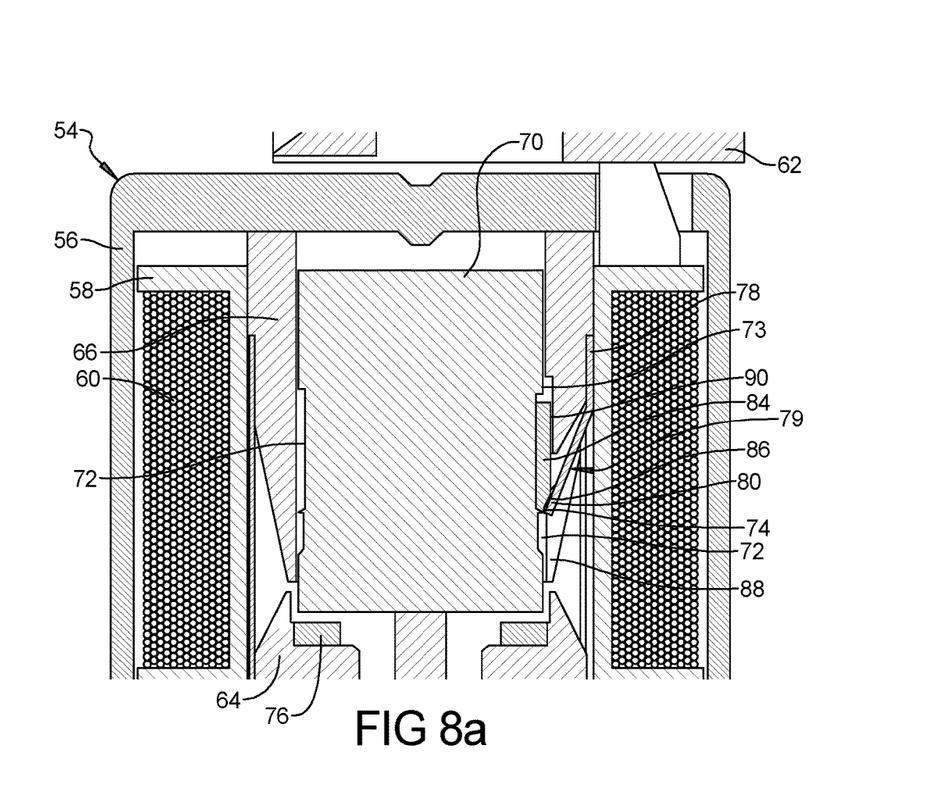
FIG. 8a is an enlarged view of a portion of FIG. 8 illustrating detail of the latch.

Referring to FIGS. 8 and 8a illustrating the latch 79 in a fifth position with the armature 70 pushing the release slide 84 out of the engaged position, the current through the coil 60 of the solenoid 54 has been further reduced. The armature 70 has move upward so that the latch ring 74 has pushed the release slide 84 so that the latch finger 80 is no longer in the detent 86 of the release slide 84. The latch ring 74 has moved under the tip of the latch finger 80 so that the armature 70 is no longer latched.

Figure 9:
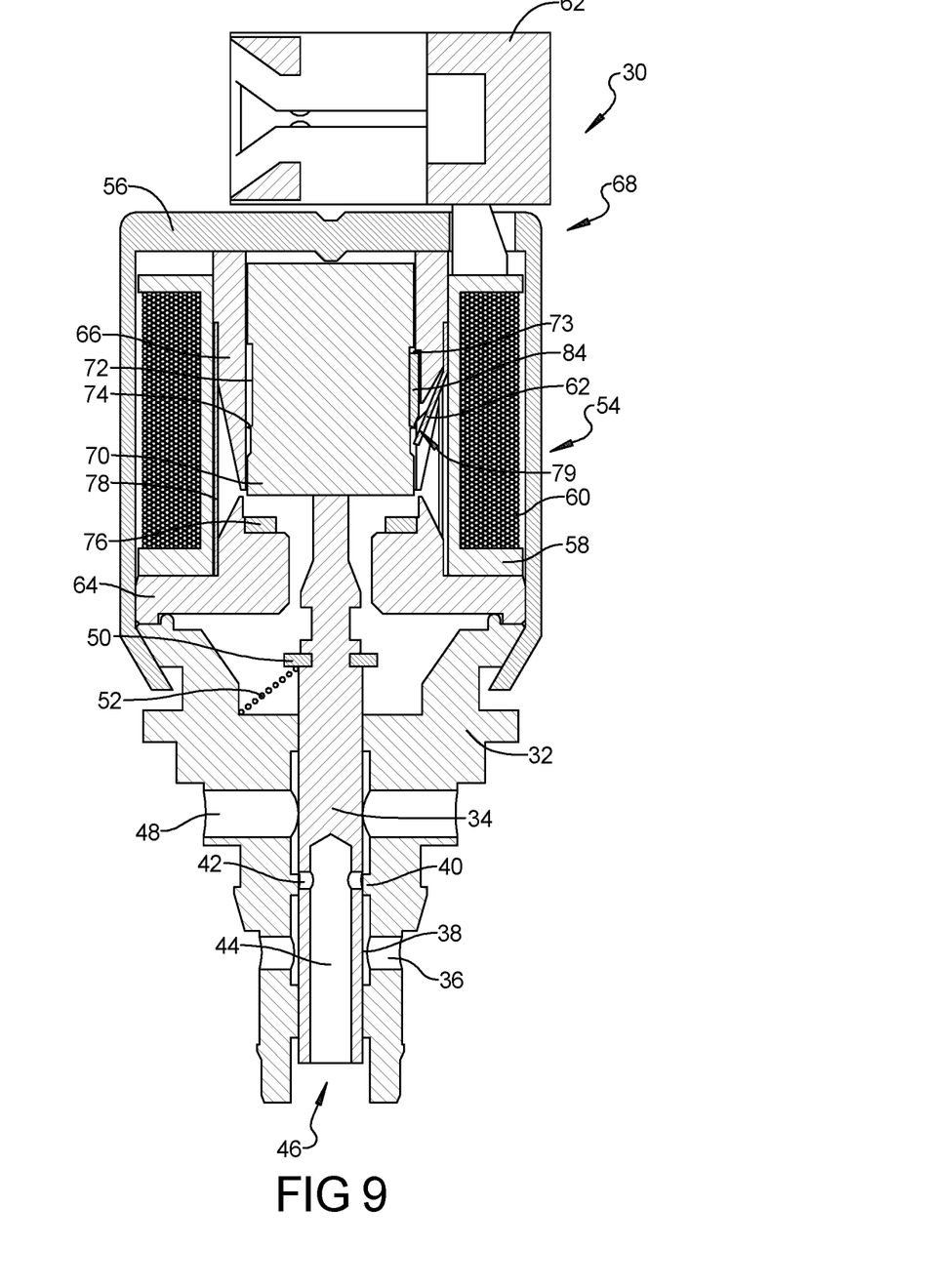
FIG. 9 is a view similar to FIG. 4 illustrating the latch in a sixth or regulating position with the release slide out of the engaged position and the armature unlatched and a valve in an exhaust or low pressure position.
Figure 9A:
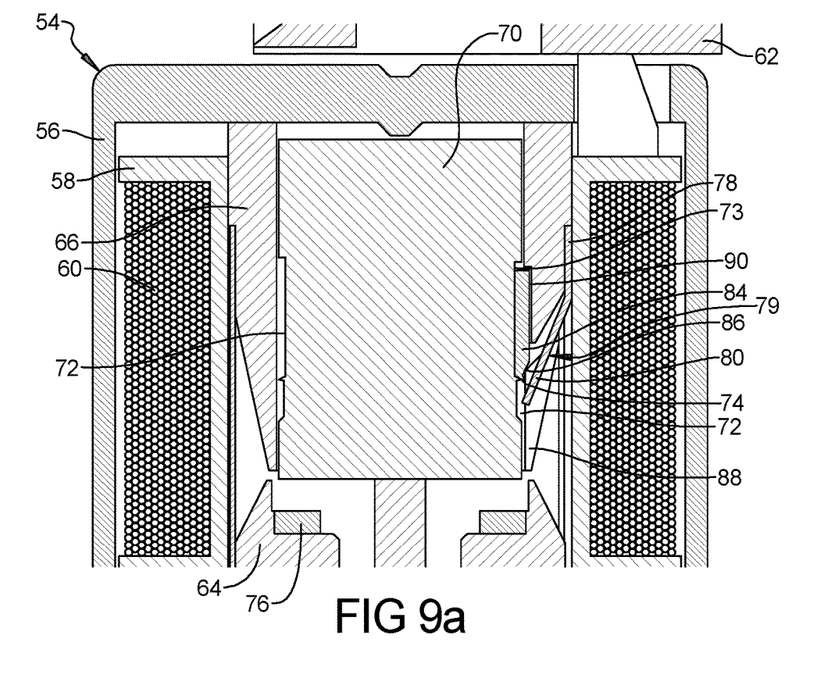
FIG. 9a is an enlarged view of a portion of FIG. 9 illustrating detail of the latch.

Referring to FIGS. 9 and 9a illustrating the latch 79 in a sixth or regulating position with the release slide 84 out of the engaged position and the armature 70 unlatched and the valve 34 in an exhaust or low pressure position, the current through the coil 60 of the solenoid 54 has been further reduced. The latch ring 74 is not in contact with the latch finger 80. The armature 70 is free to move within the regulating zone.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A solenoid for a solenoid-actuated valve, said solenoid comprising:
   a coil;
   a flux tube and a pole piece disposed axially from said flux tube and encircled by said coil;
   a movable armature disposed in said flux tube and said pole piece; and
   a latch disposed between said flux tube and said pole piece to selectively latch said armature into at least one position; and
   wherein said latch comprises a flexible spring finger for latching on said armature.

2. A solenoid as set forth in claim 1 wherein said latch includes an alignment tube to align said flux tube and said pole piece together and said flexible spring finger being incorporated into said alignment tube.

3. A solenoid for a solenoid-actuated valve, said solenoid comprising:
   a coil;
   a flux tube and a pole piece disposed axially from said flux tube and encircled by said coil;
   a movable armature disposed in said flux tube and said pole piece;
   a mechanical latch disposed between said flux tube and said pole piece to selectively latch said armature into at least one position, said latch comprising a flexible spring finger for latching on said armature; and
   a movable release slide disposed between said armature and said flux tube and cooperating with said latch to release said latch from said at least one position to a released position.

4. A solenoid as set forth in claim 3 wherein said latch includes an alignment tube having said flexible spring finger, said armature having a locking ring and a first shoulder to move said release slide into the released position and a second shoulder to push said release slide out of engagement with said spring finger.

5. A solenoid as set forth in claim 4 wherein said release slide has a detent to engage said spring finger.

6. A solenoid for a solenoid-actuated valve, said solenoid comprising:
   a coil;
   a flux tube encircled by said coil;
   a pole piece disposed axially from said flux tube and encircled by said coil;
   a movable armature disposed in said flux tube and said pole piece;
   a movable valve cooperating with said armature to control fluid flow; and
   a mechanical latch disposed between said flux tube and said pole piece to selectively latch said armature into at least one position; and
   wherein said latch comprising a flexible spring finger for latching on said armature.

7. A solenoid as set forth in claim 6 wherein said armature has a latch ring and said latch comprises said flexible spring finger for latching on said latch ring of said armature.

8. A solenoid as set forth in claim 7 wherein said latch includes an alignment tube to align said flux tube and said pole piece together and said flexible spring finger being incorporated into said alignment tube.

9. A solenoid for a solenoid-actuated valve, said solenoid comprising:
   a coil;
   a flux tube encircled by said coil;
   a pole piece disposed axially from said flux tube and encircled by said coil;
   a movable armature disposed in said flux tube and said pole piece;
   a movable valve cooperating with said armature to control fluid flow;
   a mechanical latch disposed between said flux tube and said pole piece, said latch comprising a flexible spring finger to selectively latch said armature into at least one position; and
   a movable release slide disposed between said armature and said flux tube and cooperating with said latch to release said latch from said at least one position to a released position.

10. A solenoid as set forth in claim 9 wherein said latch includes an alignment tube having said flexible spring finger, said armature having a locking ring and a first shoulder to move said release slide into the released position and a second shoulder to push said release slide out of engagement with said spring finger.

11. A solenoid as set forth in claim 10 wherein said release slide has a detent to engage said spring finger.

12. A solenoid as set forth in claim 9 wherein said latch includes an alignment tube having a flexible spring finger, said valve having a locking ring for latching on said valve, a first shoulder on one of said valve and armature to move said release slide into the released position and a second shoulder on one of said valve and armature to push said release slide out of engagement with said spring finger.

13. A solenoid as set forth in claim 12 wherein said release slide has a detent to engage said spring finger.

14. A solenoid-actuated valve comprising:
   a solenoid;
   a valve body connected to and operatively associated with said solenoid, said valve body having at least one fluid inlet port and at least one fluid outlet port for fluid flow;
   a valve axially and slidingly disposed within said valve body; and
   said solenoid comprising a coil, a flux tube, a pole piece disposed axially from said flux tube and encircled by said coil, a movable armature disposed in said flux tube and said pole piece, and a latch comprising a flexible spring finger disposed between said flux tube and said pole piece to selectively latch said armature into at least one position.

* * * * *